2 Sheets—Sheet 2.

F. W. WIESEBROCK.
Glass-Lined Fountain.

No. 201,142. Patented March 12, 1878.

WITNESSES,
Rudolph F. Eilenberg
George Warr Jr.

INVENTOR,
Frederick W. Wiesebrock
by Schatz & Salmon
Attys.

UNITED STATES PATENT OFFICE.

FREDERICK W. WIESEBROCK, OF BROOKLYN, NEW YORK.

IMPROVEMENT IN GLASS-LINED FOUNTAINS.

Specification forming part of Letters Patent No. 201,142, dated March 12, 1878; application filed January 28, 1878.

*To all whom it may concern:*

Be it known that I, FREDERICK W. WIESE-BROCK, of the city of Brooklyn, county of Kings, State of New York, have invented a new and Improved Glass-Lined Fountain, which is fully described in the following specification and accompanying drawing.

Figure 1:
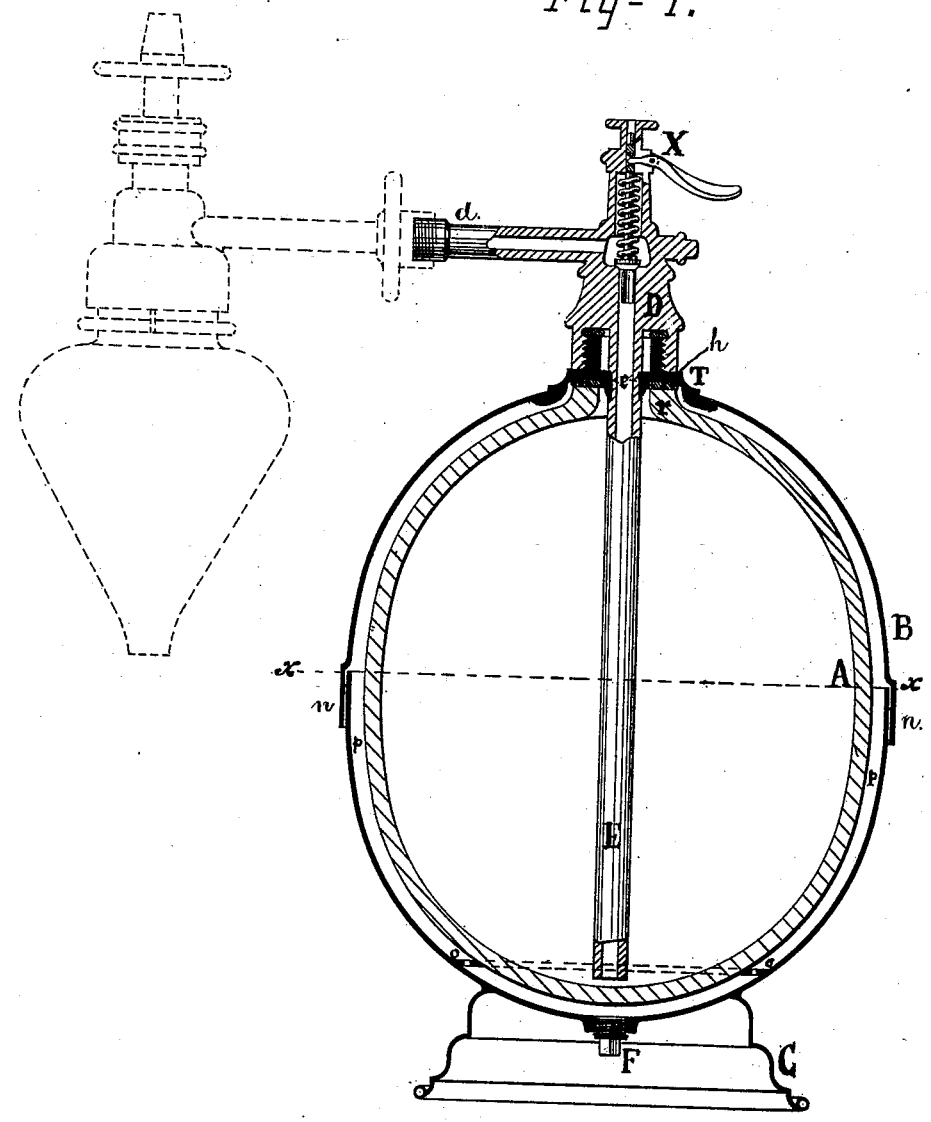
Figure 2:
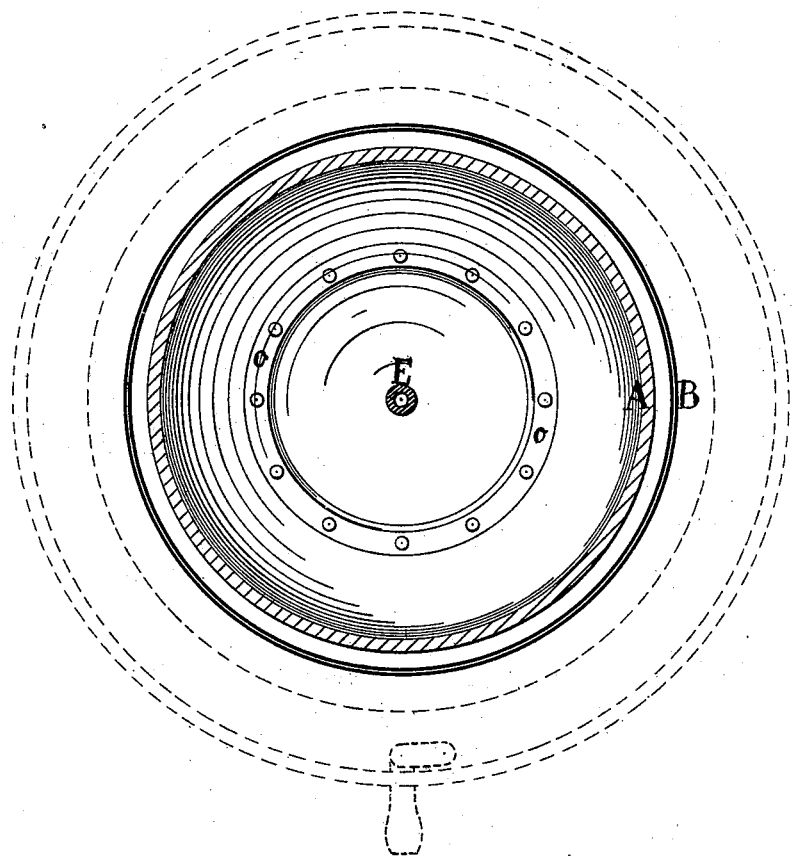

Figure 1 is a central vertical section, and Fig. 2 a transverse section on line $x\ x$.

Similar letters represent corresponding parts.

The object of my invention is to produce a portable vessel designed to contain effervescent liquids, such as champagne wines, the vessel being so constructed that corrosion of the metal of which the vessel is made cannot take place by reason of the liquid contained therein coming in contact with the metal, and also thereby preserving the liquid.

In the drawings, letter A represents the glass vessel or glass lining of the fountain, the glass vessel being provided at one end with the neck $r$. B represents the outside or metal shell, which is made of two sections. C represents the foot-pieces upon which the fountain stands. D is the siphon top or valve, having attached to it arm $d$, with screw-threaded end, by means of which a draft apparatus is attached to the fountain. E is the ordinary siphon-tube, made of hard rubber or other suitable material, communicating with the top D. F is a plug in the bottom section of the metallic shell B, provided for the purpose of filling the space between the glass vessel A and the shell B with liquid, as will be more fully shown hereainfter. T is the bung, sweated to the upper section of the shell, on the inside, the bung being provided with a thread, by means of which the top D is attached or fastened. $h$ represents an elastic washer, placed between the mouth of the glass and the bung T, for the purpose of making an air-tight joint. $o$ is a perforated disk or seat, fastened on the interior of the lower section of the shell, upon which the glass vessel rests. $p$ is the space between the glass vessel and the metal shell. $e$ is an elastic collar, fitting into a recess provided for that purpose on the tube E. $n$ is the lap of the upper section of the shell, fitting over the lower section, and by means of which lap the two sections are sweated together. The dotted lines $x\ x$ represent a transverse section of the fountain, as shown by Fig. 2.

In Fig. 2, A represents the glass lining; B, the metallic shell; E, the siphon-tube; and $o$ represents the perforated disk or seat.

In practice I proceed as follows: Having placed the glass vessel A in position by seating the same upon the disk $o$, I lay the elastic ring or washer $e$ upon the mouth of the vessel A, and affix the upper section of the shell. The shells, after being pressed together, are sweated to each other by means of the lap $n$. The space between the glass vessel and metallic shell is then filled with a suitable liquid. The plug F is then put in place for the purpose of preventing the escape of the liquid. The object of filling the space with liquid is to provide a cushion, and in that capacity serves two purposes: first, it resists the force of the liquid, which is charged heavily with gas, which force, unless counteracted in some manner from the exterior, would burst the glass vessel; second, it is the cushion calculated to resist the shocks sustained by the fountain while in transit.

The escape of the liquid contained in the vessel is cut off by means of the collar $e$, which is passed over the tube F, and fits into a recess provided for that purpose in the tube. The tube is then introduced into the vessel by means of the mouth. The collar fills the space between the mouth and tube. The collar is of a conical shape, so that when the top D is fastened by means of the screw-thread on the bung the collar is jammed between the inner surface of the neck of the vessel and the tube E, thus making an air-tight joint, and thereby preventing the escape of the liquid, which, if allowed to escape, would corrode the metal. The liquid, by non-contact with the metal, is preserved from contamination.

What I claim as new, and desire to secure by Letters Patent, is—

1. In a fountain, the combination of the perforated disk $o$, fastened to the interior of the metallic shell B, said shell being provided with an opening into which fits plug F, substantially as described, and for the purpose herein set forth.

2. In a fountain, the combination of the shell B, provided with the bung T, the opening and plug F, the sweating-lap n, the perforated disk o, the elastic washer h, the glass lining A, the tube E, provided with elastic collar e, the space p being filled in with a liquid, substantially as described, and for the purpose herein set forth.

Dated New York city, January 16, 1878.

FREDERICK W. WIESEBROCK.

Witnesses:
    JACOB H. ALBECK,
    RUDOLPH F. EILENBERG.